June 25, 1968 K. LINN 3,389,474
DECORATIVE MOLD GUIDE APPARATUS
Filed May 10, 1967 2 Sheets-Sheet 1
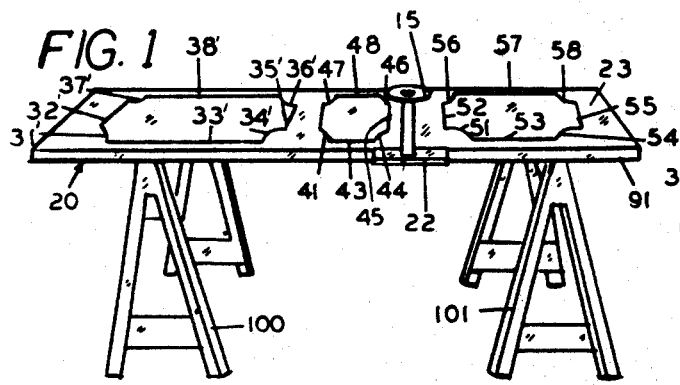
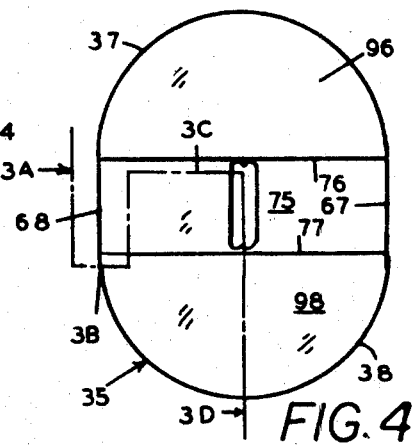
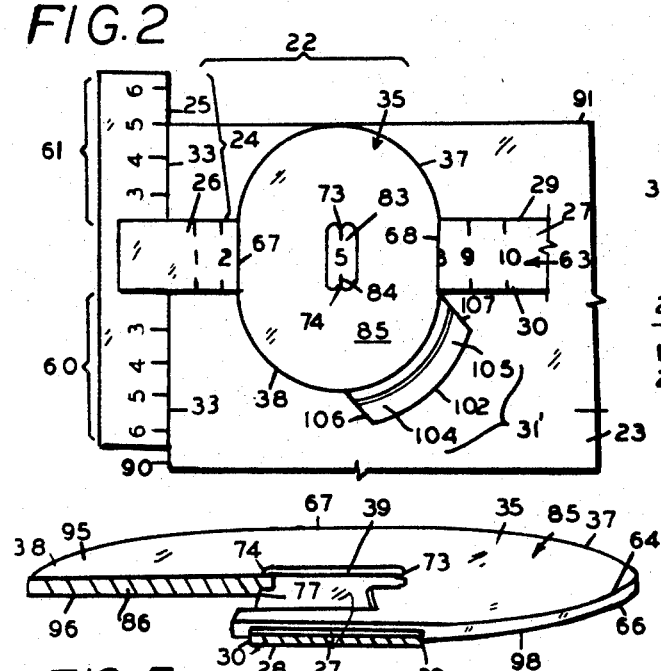
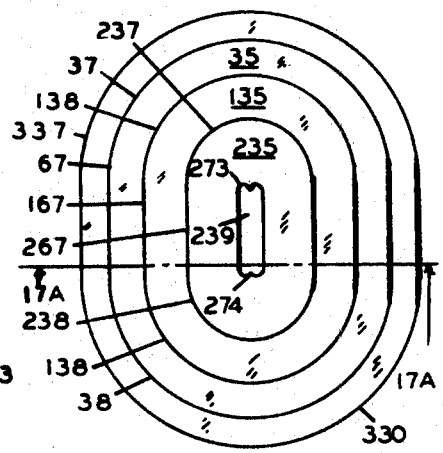
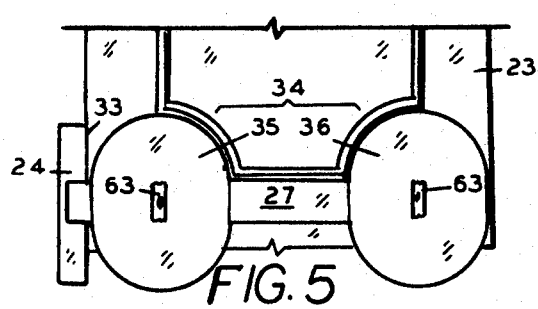
KENNETH LINN
INVENTOR.
BY
*Ely Silverman*
ATTORNEY
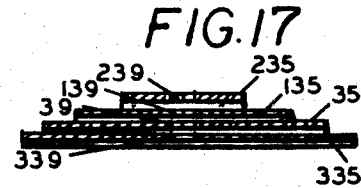

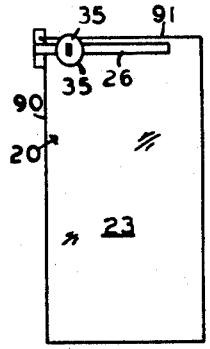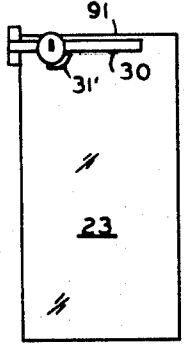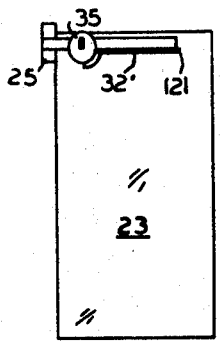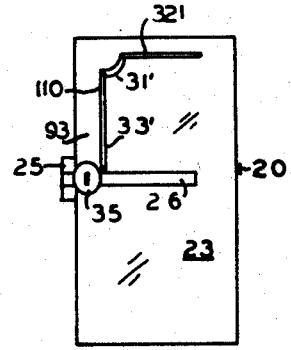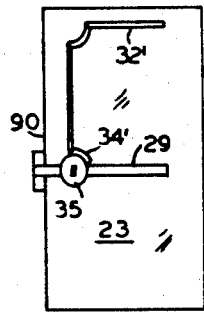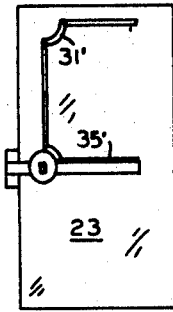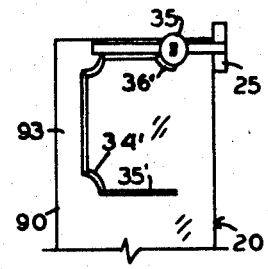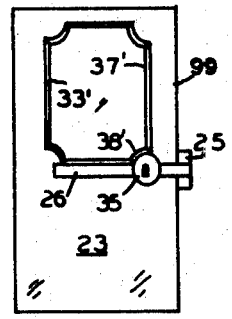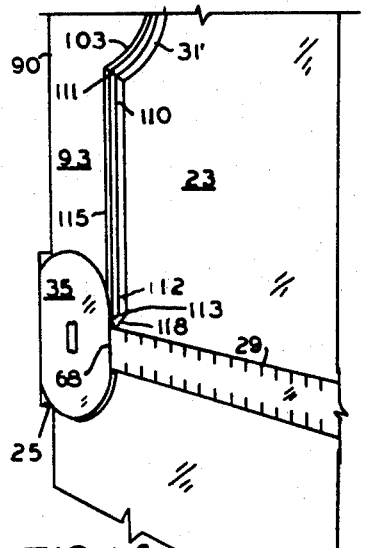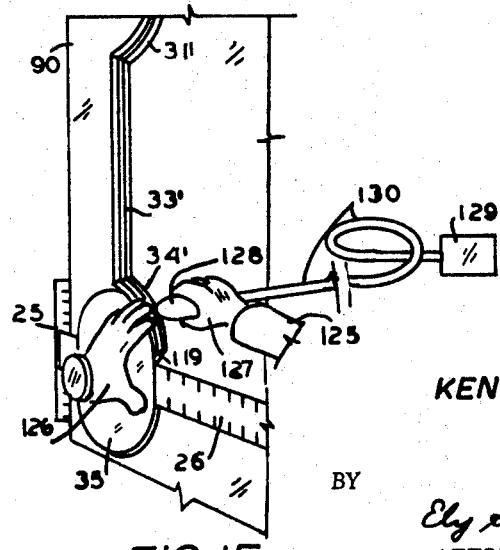

United States Patent Office 3,389,474
Patented June 25, 1968

3,389,474
DECORATIVE MOLD GUIDE APPARATUS
Kenneth Linn, Amarillo, Tex., assignor to Maywood, Inc., Amarillo, Tex., a corporation
Filed May 10, 1967, Ser. No. 637,453
4 Claims. (Cl. 33—174)

ABSTRACT OF THE DISCLOSURE

Apparatus for aligning and locating curved molding elements on a structure such as a door. This apparatus comprises a T square with a blade: the blade is calibrated and an edge of the head is calibrated and the calibrations on the head are arranged in predetermined and fixed relation to the edges of the blade attached thereto; each of a plurality of sliding templates providing curved surfaces are made to be movably and removably locatable on the blades and are each provided with a slot for indexing and orientating the curved surface thereof with respect to the edge and head of the T square. These templates have curved outer surfaces which match the shapes of curved molding element to be used therewith. The center of curvature of the curved outer surfaces are in fixed relation to although spaced away from the index point in the index slot of the template and the edge of the blade and head. Further still, the invention comprises one or more templates of a variety of sizes and arc shapes for concurrent use with the blade and each other.

---

The use of molding to soften the starkness of modern style doors as well as to provide varied patterns such as areas bounded by borders, abstract patterns, letters and numbers is well recognized (c.f. "Molding Makes the Difference," page 1433 of Popular Mechanics, Home Handyman Encyclopedia, volume 3, J. J. Little & Ives Company, New York, 1961). For such purposes there are currently about 500 standard patterns of molding. However, the mechanics for the placement of curved pieces of molding to obtain patterns thereof in an artistically desirable and pleasing manner has been time consuming not only for the artistic hobbyist but also for the commercial producers of doors and shutters and related commercial and domestic items, and the resulting labor cost of such assembly has been a deterrent to the full development of the artistic effects of which such moldings are capable.

Presently, the alignment of pieces of molding is effected by joining in series one edge of one piece of molding to the edge of another piece of molding. When this is done however, the desired final effect of the intended pattern is frequently lost due to small variations in dimensions and location of the molding pieces. The failure of adjacent pieces to meet closely at their intended line and surfaces of junction results in a gap therebetween: such gap destroys the desired artistic effect to be created by the use of the molding pieces: the gap is usually not apparent until an attempt is made to join the last of the pieces in a loop or closed pattern with the first of the molding pieces used in that pattern.

Errors in the placement of the molding are not readily cured as by pulling out nails or replacing or altering the pieces because the smooth surface of the decorative trim can be marred; accordingly, the placement must be accurate the first time; usually the last of the pieces in a loop or closed pattern is fitted and cut by hand. This is a time-consuming and, commercially, an expensive procedure. This procedure usually requires manual scribing of arcs, manual cutting, and other manual handling of each piece in much the same way as was, roughly, done in biblical times.

By the apparatus and process of this invention various pieces of curved molding to be used in the pattern may be aligned and joined without requiring the use of exact layouts and corrective cutting. According to the process of this invention using the apparatus hereinbelow described, the trim may be located quickly and accurately starting at one point with all subsequent parts of that pattern aligned therewith without further measurement on the door surface or shutter surface.

Accordingly, one object of this invention is to provide an apparatus permitting prompt and accurate location of molding and trim on doors and other structural elements.

Yet another object of this invention is to provide an apparatus that utilizes factory-produced door, shutter and other structural element edges to locate the molding and/or trim on such element.

Other objects of this invention will become apparent to those skilled in the art on study of the below description and the drawings attached hereto. In the drawings, which form a part of this description, the same reference number refers to the same part throughout. In the drawings:

FIGURE 1 shows a general method of operating with the apparatus of this invention to locate a pattern of molding on a door;

FIGURE 2 is an enlarged view of a portion of the apparatus assembly of this invention showing the details thereof as seen from the top thereof in a step in operation of the apparatus as shown in FIGURE 7;

FIGURE 3 is a template 35 according to this invention, shown partly in perspective and partly in section along section 3A–3B–3C–3D of FIGURE 4;

FIGURE 4 is a bottom view of the full template of FIGURE 3;

FIGURE 5 is a top view of another apparatus assembly according to this invention;

FIGURES 6 through 13 diagrammatically show in plan view a sequence of steps in the operation of the apparatus of FIGURES 1–4 herein described; FIGURE 6 shows the location of the apparatus and the materials operated thereon in a first of a sequence of steps; FIGURE 7 shows the appearance of the apparatus and the materials operated thereon following the step shown in FIGURE 6; similarly FIGURES 8 through 13 each show the location of the apparatus and the materials operated upon therewith following the step shown in the preceding figure;

FIGURE 14 shows a perspective view of a step in operation using the apparatus of this invention according to the process herein described and corresponding generally to the step shown in FIGURES 2 and 9;

FIGURE 15 is a perspective view of the assembly of parts as shown in FIGURE 14 in a step in the operation of the apparatus of this invention generally as shown in FIGURE 10;

FIGURE 16 is a top view of a vertical assembly of templates according to this invention;

FIGURE 17 is a vertical cross sectional view along section 17A—17A of FIGURE 16.

According to this invention, a door 20 is provided with a pattern 21 of molding elements as 31 through 68. This door is provided with such elements in proper array by the apparatus 22 of this invention.

The apparatus 22 of this invention comprises a calibrated T square subassembly 24 and an array 34 of indexed template subassemblies. Each of the template subassemblies, as 35, is located on and cooperates with the T square guide assembly to locate curved and straight molding elements on the door surface as hereinbelow described.

The T square subassembly 24 comprises a head 25 and a blade 26 firmly fixed together. The blade 26 is rigid and has a flat calibrated top surface 27 and a smooth flat bottom face 28, a straight smooth front edge 29 and a straight smooth read edge 30 parallel to the edge 29. The head 25 is a rigid member with a calibrated top face 31, a bottom face parallel to face 31 and spaced away therefrom and a straight flat smooth inner face 33 therebetween. The face 33 is flat and normal; i.e., perpendicular to the line of edges 29 and 30. The top face 31 of the head is firmly fixed to the bottom flat face 28 of the blade 26. The head is provided with index characters (e.g. "3," "4," "5," and "6") and index lines which indicate the distance of those characters from the edge of the blade 26 that is most distant therefrom: it will be noted that each of the group (60) of the characters below (as shown in FIGURE 2) the edge 30 are numbered their distance in inches from the edge 29 while each of the group of index characters (61) above edge 29, "3," "4," "5," and "6" are located at such distance, respectively 3, 4, 5, and 6 in inches from the edge 30 of the blade 26. The top face 27 of blade 26 is provided with index characters (referred to as 63)—"1," "2," "5," "8," "9," and "10" such as shown in FIGURE 2 which run for the full length of the blade, the full length of the blade being, in the preferred embodiment, about 24 inches long. These index characters are not located at the edges of the blade but are located in the center thereof, although index lines 83 and 84 are located adjacent each number so that, although the adjacent edge of the blade be not visible when a template, as 35, is operatively connected thereto and such edge is hidden by a portion of the template, the template may be fixed relative to the index character and its index line on the face of the blade 26.

The template assembly 34 is composed of a plurality of templates such as 35 and 36. Each template is a grooved and indexed member of sufficient rigidity to maintain the relationship of the outline thereof to the index slot thereon and serve as a jig. The material of which the template is made is sufficiently soft to not harm or scratch the pieces of molding with which it is used and yet it is sufficiently rigid to withstand continued use and maintain the relationship of its periphery and the central index orifice portion thereof.

The template 35 comprises a flat body portion 85 which has rounded top and bottom edges 37 and 38, respectively, and straight left and right side edges 67 and 68, respectively. Edges 37, 68, 38, 67 and 37 are, as shown in FIGURE 2, smoothly continuous in series.

The body 35 has an upper flat surface 95 and lower flat surfaces 96, 97, and 98. All are parallel to each other. The bottom surface 97 is a portion of a rectangular transverse groove 75 of uniform section located between surfaces 96 and 98; it extends transversely of body portion 85. The top surface 95 of body 85 is provided with a window 39. It extends through the body 85 to surface 97. This window has side edges 71 and 72 and a central front index 73 and another central rear index 74.

The edges 67 and 68 are parallel to each other and to the center longitudinal axis of the body 65. The center of radius of curvature of the edges 37 and 38 passes through the longitudinal axis of the body 85. The groove 75 is provided with a vertical front edge 76 and a vertical rear edge 77. These edges are parallel to each other and spaced apart the same distance as the edges 29 and 30 of the blade 26 and form a smooth sliding fit therewith. The material of which the body is made at the edges 76 and 77 is somewhat softer than the material of and at the edges at 29 and 30 so that those edges 29 and 30 control the path of the template. The material of the template body is sufficiently sturdy so that the alignment of the two edges 76 and 77 with respect to other and the dimensional stability with respect to the axes 37 and 38 are maintained.

The jig or template 35 has a top edge in form of an arc 37 and a bottom edge in form of an arc 38. Additionally, there is a window 39 in the center of the piece. Template 35 has two mutually perpendicular axes of symmetry, one, longitudinal axis extending the length of the template from the center of arc 37 to the center of arc 38 and the other, transverse axis extending along its width. The arc 37 is, in this particular embodiment, a semicircle with the center of that circle located on the longitudinal axis of symmetry of the element 35 and over the edge 76 and at their intersection. The arc 38 is a semicircle in outline with its center of curvature also on the longitudinal axis of symmetry of the template 35 and over edge 77 and at their intersection and with the center of arc 37 and the center of arc 38 spaced away exactly by the width of the blade 26 along the central longitudinal axis. The window 39 is of sufficient width to clearly show the number used as an index on the face 27. Window 39 is located with its center and its index points 73 and 74 on the longitudinal axis of symmetry of template 35.

This structure provides that the edges index edges 73 and 74 are located on either side of the lines of the index characters as 63 on the upper face 27 of the blade 26. Accordingly, the bottom point of the index edge, as 73, directly contacts the surface 27 of the blade 26 and there is no parallax error of observation or of placement of template 35 on blade 26 due to the depth of the thickness of the body 35 in the area of the window. Additionally, as the apparatus is mirror image symmetrical about a transverse axis in the center of and parallel to length of groove 75 the location of the index points 73 and 74 and, accordingly the location of each of the portions of the curved edges, as 37 and 38, is readily fixed without any parallax error relative to the location of the T square due to the position of the operator using the apparatus. Thus, although the apparatus with its index points is quite sturdy, the reading of the index points 73 and 74 relative to the scale on face 27 is accomplished without any parallax error as might otherwise be obtained were such a sturdy index not in direct contact with the index or scale lines of the index characters on the face 27. The bottom points of the index 73 and 74 are, as shown in FIGURE 3, extremely well mechanicaly protected by the remainder of the apparatus, notwithstanding extended usage as a jig, as below described, as well as a template, as herein referred to.

Thus, although the point at the top surface 95 may suffer a certain amount of wear, the index point at the level of surface 97 indicates the location of the center of the radius of curvature of a curved edge as 37 relative to surface 33 to within $\pm 1/32$ inch or less. In decorative or artistic work such as that for which the moldings in this field are intended these small dimensions are quite important. The exact location of the axis of symmetry of curved edges, as 37 and 38, is determined by the location of the edge 29 or 30 of the blade 26 on the line determined by the index points 73 and 74 and the characters on the face 27.

In a process embodying the use of one apparatus of this invention a flat faced wooden door 20 is supported in a horizontal position at a convenient working height on a pair of carpenter's saw horses 100 and 101.

The inner face 33 of the T square head is placed along one side edge 90 of the door 20 with face 28 of blade 26 on upper face 23 of door 20 with the top edge 91 of the door 20 aligned with an index line of the number "5" on the head 15 for a spacing of 5 inches between the top edge 91 and the top members 32', 31', and 36' of the molding pattern composed of pieces 31' through 38'.

Following the placement of the T square 25, template 35 with a convex curved surface 37 matching the size of the concave arc of the curved piece 31' to be used on the door 20 is located with the template groove edges 76 and 77 located in sliding engagement with the edges 29 and 30 of the blade 26, faces 96 and 98 in sliding engagement with face 23 and with the indicator index points 73 and 74 aligned with the measurement character "5" on the blade 26 for a 5-inch side margin 93 of the pattern of pieces 31' through 38'.

When the template 35 and the T square 24 are in place as above described, then a molding or trim arc 31' is put into place, as shown in FIGURE 7. The exemplary piece 31 is a curved molding or trim piece formed of a wooden body 102 and ends 104 and 105 which is curved in a semicircle; it has a concave edge 103 with a radius of curvature corresponding to a 3¼ inch radius circle which is the exact radius of exterior curvature of the edges 37 and 38 of the template 35.

Edge 103 forms 90 degrees of a circle so that the ends of edge 103 are directed in directions at 90 degrees to each other. Edge surfaces 107 and 106 are mitered at 40 degrees to the adjacent edge 103 and extend vertically from the flat surface 23 and are parallel to each other.

Piece 31' is located in its proper place by locating the edge 103 on edge 38 of template 35 with edge 107 of piece 35 contacting blade edge 30 and edge 106 in line with index character "5" indicated by index points 73 and 74 and the central longitudinal axis of template 35.

While the operator rests his weight on one hand which is located on the template 35 and firmly holds that template in place on the face of the door and with the fingers of the same hand holds the piece 31' against edge 38, his other hand operates a stapler (or nailer) to drive staples (or nails) into the molding piece 31 and door face 23 to fix that molding to the door.

The firm location of the molding piece by the assembly 22 and the operator's hand overcomes any vibration produced by the stapler (or nailer, if used) that might otherwise tend to change the orientation of the piece 31 during the time of impact of the fastening element thereon. This firm location is assisted greatly by the firm fit of the template face 98 on the door surface and the firm fit of groove 75 on blade 26. Blade 26 is rigidly attached to the head 25.

Thereafter, as shown in FIGURE 8, the top edge of a piece of straight molding 32' of the same transverse cross-section as 31', and also mitered at 50 degrees at its ends to provide end surfaces 50 degrees to the top edge and length of such piece and 90 degrees to the surface 23 is applied against the bottom edge 30 of the blade 26. This will be in exact alignment with the face 107 of pre-mitered arc piece 31' and molding piece 32 members or fits closely with the adjacent secured edge 107 of the aligned and located corner arc 31'.

After fastening the arc 31' and the top molding trim piece 32 as shown in FIGURE 8, the first side trim piece 33' which side piece is similar in section to piece 32' and also similarly pre-mitered at its ends is placed on face 23 of the same side of the door 20 as the head 25 of the T square 24. One, upper end of piece 33' is placed with its pre-mitered (at 50 degrees to length of piece 33) edge 111 in contact with the mitered surface or edge 106 of arc piece 31'. The T square is moved into position at the outer edge 113 of the lower end of the mitered side piece with the side edge 68 of the template 35 (not the indicator index 73) adjacent to and aligned with a measurement as "5" on the surface 27 as shown in FIGURE 14. This uses the measurement on surface 27 (indicated by edge 68) as a guide for locating a side piece as 33 with the correct side margin. Template 35 is again firmly held in its location on door surface 23 as above described by the operator's hand and the end of piece 33' is similarly held against the template and while so held, as above described, a stapler is used to drive staples through piece 33' to hold it securely in place on surface 23.

In a particular embodiment of this process shown generally in FIGURE 9 as to sequence and in FIGURE 14 in some detail, the bottom projecting edge 113 of end portion 112 of the straight pre-mitered molding trim 33' is located against the straight side edge 68 of the template 35. Edge 68 is located at the index line for the number "5" as there shown. The edge 67 extends over the left hand edge of the blade 26. At this point it will be noted that the bottom face 96 of the body of the template smoothly goes over the top face of head 25 of the T square 24 as the depth of groove 75 is the same as the thickness of blade 26. This provides for exact as well as correct alignment of the piece of molding arc as 33' against the edges as 37, 36, 68, or 67 of each template, as 35. The piece 33' may then be held against and securely fastened to face 23 as above described for piece 32'.

The position of the template 35 on the guide and of the T square are then together moved to the position shown, in relation to the entire door in FIGURE 10 and in detail in FIGURE 15. With the indicator index 73 aligned with the intended location of the outer edge 115 of piece 33' ("5" in this particular case) a second molding arc piece 34' identical to 31' is then placed with its concave curved edge 116 (corresponding to edge 103 of piece 31) on the curved portion 37 of the piece 35' with its upper left hand mortised edge 117 in proper and close fit with the mitered face 118 at the lower end 112 of the side trim piece 33'.

Following this location of piece 34, a straight trim piece 35 matching each of pieces 31' through 34' in transverse section and pre-mitered at its ends with a 50 degree cut is firmly located on the top edge 29, of the blade 26 with its left hand edge 120 located against the mitered face 119 of the piece 34' in a close and aligned orientation therewith and, while firmly held against the blade 26, is firmly installed on the face of the door 20.

Following this, the T square 24 is moved to the opposite side 99 of the door shown with blade edge 30 firmly adjacent the top straight edge of piece 32' on the door 20. The template 35 is located with its side edge 67 generally as shown in FIGURE 12, but spaced away from direct contact with the right pre-mitered edge 121 of piece 32.

An arc piece 36', identical with 31' is then located in place as follows.

The upper left mitered edge of the arc piece 36' is held in contact with the blade edge 30 and the concave edge of piece 36' is held in firm contact with edge 38. The template 35 and the arc piece 36' thereon are then moved leftward to the position as shown in FIGURE 12; i.e., until the mitered face of right end of piece 32' and the upper left hand mitered face of piece 36' are in firm and smooth contact.

Template 35 is again firmly held in location against door 20 as above described by the operator's hand and the concave edge of piece 36' is similarly held against the curved edge 38 of the template and while so held as above described, an automatic stapler is used to drive staples through piece 36' to hold it securely in place against the impact of the staples from gun 128.

The top right arc piece 36' is thus fastened into position on door 20. There is no attempt to align this piece for the side margin adjacent edge 93 at this point because, as below described, this is not necessary.

The T square 25 is then moved, as shown in FIGURE 13, to the bottom right corner of the pattern to be formed of pieces 31'–38' with the blade 26 top edge 29 butting up to the secured straight piece 35'. The last arc piece 38' which is similar to arc pieces 31', 34', and 36' is then located on the right hand edge 133 of the piece 35' and the straight piece 37' is located relative to piece 36' and piece 38' as follows: the concave edge of arc 38' (corresponding to edge 103 of arc piece 31') is firmly held to the left side of edge 37 (left side as seen in FIGURES 2 and 6–13) and the bottom left edge of piece 38' (corresponding to edge 107 of arc piece 31') is held in contact with blade edge 29. The left edge of piece 38' is located against the right hand mitered edge of the straight piece 35' and the upper end of piece 37' is laid on the door face 23 adjacent to the lower end of arc piece 36'. At this point, any minor adjustments for membering the upper edge of arc piece 38' and the lower edge of straight piece 37' may be made. This requires only minor adjustment and probably none at all if the other pieces were fastened correctly which they would be by use of this apparatus as above described and if the dimensions of the parts were exact. It should be noted that this operation required the location of the arc 31'; thereafter the apparatus 22 of the invention provides for adjustment and alignment of all the other pieces relative thereto. If more than one panel is being installed on the door, one may proceed as follows:

If more than one panel such as that formed of pieces 31'–38' is to be installed on the door, the operator puts the head 25 of the T square 24 on the side 91 of the door and, with the T square at the bottom edge of the panel just completed, marks the door for spacing between panels by putting a mark at the edge 91 of the door in line with the bottom edge 120 of the panel formed of pieces 31'–38'. If one desires to start a second panel, as of members 41–48, five inches below edge 120, one makes a note to put the number "5" of the marking group 60 on the head 25 in line with the bottom edge 120 of piece 35' of the panel formed of pieces 31'–38'. The head of the T square is moved down the edge of the door with the face 33 adjacent to the edge 91 of the door and thereby aligns the bottom edge 30 of the blade 26 at the desired graduation between panel spacing. At this point the template 35 with a suitable size of arc is put on the blade of the T square 24 with the indicator index thereof aligned with a measurement on the blade for the intended side margin for that particular pattern, and thereafter the steps above described are repeated for a pattern of a group of molding pieces as 41–48 as above described for pieces 31'–38'. Thereafter another panel of pieces as 51–58 may be similarly arrayed on surface 23.

The invention comprises, further, the use of a combination of templates such as 35, 135, 235 and 335 shown in FIGURE 16 each of different size and with different curvature of their surfaces yet all having the same size index hole as 39 and all having straight side edges corresponding to edges 67 and 68, and same size groove as 75. Dimensions are given in Table I herebelow. The reference numerals for each of the portions shown for template 135 are, in the last two digits, the same reference numerals as those shown for template 35, but with the corresponding structure shown on template 35 having reference numerals 100 units lower than those shown for element 135. Similarly, for the template 235, the portions thereof corresponding to portions of template 35 are indicated by reference numbers 200 units higher than those reference numbers shown for unit 35. This permits use of the T square 25 with arcs of varied size and shape. In all these templates the axis of longitudinal symmetry passes through the index points 73 and 74 for ready location of a curved piece of molding, as 31', in any relation to a window as 39, i.e., to its left or right and above or below it, whereby such molding may be reliably and rapidly located and held in place while being fastened in place as above described.

In the above discussion of miter angles, 50 degrees means 50 degrees between the right hand edge 115 and face 118 of piece 33' and 50 degrees between edge 115 and face edge 111 of piece 33' and there are corresponding 50 degree angles between the other straight pieces as 32', 35', and 37' at their ends. This angle at the very corner of the curved pieces that match these straight pieces, such as the solid angle at the corner of face 106 and edge 103 on piece 31' is only 40 degrees and similarly the solid angle at face 107 and edge 103 is 40 degrees and the solid angle at piece 34' between face 119 and edge 116 is 40 degrees. The 50 degree angle of the straight piece is used when the molding pieces are 1¼" wide.

Also, two templates may be simultaneously located on the T square 25 to permit two operators to concurrently work on the same door as shown in FIGURE 5.

The templates 35, 135, 235 and 335 are made of hard fiberboard and have the following dimensions:

TABLE I

|  | No. 35 | No. 135 | No. 235 | No. 335 |
|---|---|---|---|---|
| Height, inches | 8½ | 8 | 6½ | 11 |
| Width (62–68), inches | 6½ | 6 | 4½ | 9 |
| Thickness (95–96), inches | 15/64 | 15/64 | 15/64 | 15/64 |
| Groove 75, depth, inches | ½2 | ½2 | ½2 | ½2 |
| Groove 75, width, inches | 2 | 2 | 2 | 2 |
| Curvature of 37 | (1) | (1) | (1) | (1) |
| Curvature of 38 | (1) | (1) | (1) | (1) |
| Radius, inches | 3¼ | 3 | 2¼ | 4½ |
| Weight, ounces | 5½ | 4¾ | 3 | 9 |
| Window 39, width, inches | 9/32 | 9/32 | 9/32 | 9/32 |
| Window 39, Length (73–74), inches | 1⅞ | 1⅞ | 1⅞ | 1⅞ |

1 Circular.

The space between the side edges of the window 39 is about 1½ times as wide as the width of two of the reference characters used on surface 27. It is thereby sufficiently wide for an operator to quickly and accurately locate the window 39 over the desired number on the surface 27. The space between guide index points 73 and 74 is related to the length of the guide lines or calibration lines on surface 27. The index points do not hide the calibration lines on surface 27; to the contrary, the numbers are located at each full inch and the edges 29 and 30 are calibrated to sixteenths of an inch. In the particular embodiment hereinabove described, with a blade that is 1⁶³⁄₆₄" wide and ½6" thick the index line for each full inch extends ⅝"; for each full ½" extends ⅜"; for each full ¼" extends 9/32"; for each full ⅛" extends 5/32"; and for each full 1/16" extends 3/32" from edge 29 and from edge 30 and numbers on the surface 27, which surface is white, are each ⅜" high and 3/16" wide and dark black. The width of a pair of numbers on surface 23 (such as "22") is ⅜"; the width of window 39 is 9/16" and the distance between index points 83 and 84 is 1⅞". The window 39 may be as wide as the space between the centers of reference characters as "5" and "6" whereby a reference character on surface 27 will always be visible through the window 39. The window is kept as narrow as possible within the above limits to avoid providing a point of mechanical weakness that would interfere with the strength of the plate 35.

T square 24 is made of aluminum and has dimensions as follows: head 33 is 11" in length; 1½" in width; and ¼" thick; and blade 27 is 25½" in length; 1⁶³⁄₆₄" in width; and ½" thick.

In the particular embodiment of apparatus above-described, the operator 125, shown by his hands 126 and 127 in FIGURE 15, uses a standard commercially available stapler gun 128 (a Senco Stapler Tacker Model JN2330–58) weighing about two pounds; the stapler is operatively connected to a standard commercially available compressor, 129, therefor (a Bell and Gossett Compressor Model SYC–10–1) by a standard flexible air hose 130.

I claim:
1. Apparatus for aligning trim elements comprising a T square and guide template,
   said T square comprising a head and a blade, the head firmly connected to the blade, the blade being rigid and elongated and having a smooth top surface and a smooth bottom surface and a straight edge therebetween and extending along the length of the blade on each side thereof and evenly spaced graduations and index numbers on one surface of the blade, said index numbers being in proximity to said graduations, said head being rigid and comprising a flat surface at right angles to the length of the blade and a top surface firmly in contact with a portion of the bottom surface of the blade, said head having a series of calibrated index lines and index numbers on both sides of said blade, each series of index lines and numbers indicating the distance of said index lines from the distance edge of the blade, the index number and line on said blade indicating the distance thereof from said flat surface on said head at right angle to the length of said blade, said guide template comprising a flat plate, a pair of symmetrical curved edges on said plate, said plate having a flat top surface and generally flat grooved bottom surface, a groove in said bottom surface having substantially the same depth as the thickness of said blade and substantially the same width as the width of said blade for slidable engagement therewith, said groove extending transversely of said plate from one side of said plate to the other, said plate have straight side edges adjacent said groove, said side edges joined by curved front and rear edges, said curved edges being of the same size and shape, and the portions of said curved surfaces being symmetrically arrayed about an axis of longitudinal symmetry at right angles to the length of the transverse groove, a window extending through said plate and located on the said axis of longitudinal symmetry, said window having side edges and end edges, said side edges spaced apart at a distance greater than the width of said index numbers on said blade.

2. Apparatus as in claim 1, wherein said curved edges being smoothly joined to said side edges.

3. Apparatus as in claim 2, wherein said curved edges are curved in form of a circle, and each radius of curvature of said curve is located on said axis of symmetry above one edge of the groove.

4. Apparatus as in claim 2, wherein said template is one of a series of templates of different length and width and each of which has the same size groove on the bottom surface thereof and each of which has a window of the same size and each of which has an axis of symmetry passing through the window.

No references cited.

SAMUEL S. MATTHEWS, *Primary Examiner.*